(12) United States Patent
Thatcher et al.

(10) Patent No.: US 11,490,575 B2
(45) Date of Patent: Nov. 8, 2022

(54) SYSTEM AND METHOD FOR DETECTING AND REMOVING DEFLECTION STRESSES FROM IRRIGATION MACHINE SPANS

(71) Applicant: Valmont Industries, Inc., Omaha, NE (US)

(72) Inventors: Tracy A. Thatcher, Gretna, NE (US); Mark Moeller, Valley, NE (US)

(73) Assignee: Valmont Industries, Inc., Omaha, NE (US)

( * ) Notice: Subject to any disclaimer, the term of this patent is extended or adjusted under 35 U.S.C. 154(b) by 255 days.

(21) Appl. No.: 16/916,906

(22) Filed: Jun. 30, 2020

(65) Prior Publication Data

US 2021/0007298 A1 Jan. 14, 2021

Related U.S. Application Data

(60) Provisional application No. 62/873,392, filed on Jul. 12, 2019.

(51) Int. Cl.
| | | |
|---|---|---|
| A01G 25/02 | (2006.01) | |
| A01G 25/09 | (2006.01) | |
| A01G 25/16 | (2006.01) | |
| G05B 19/042 | (2006.01) | |

(52) U.S. Cl.
CPC ......... *A01G 25/092* (2013.01); *A01G 25/023* (2013.01); *A01G 25/165* (2013.01); *G05B 19/0425* (2013.01)

(58) Field of Classification Search
CPC .. A01G 25/023; A01G 25/092; A01G 25/165; G05B 19/0425
See application file for complete search history.

(56) References Cited

U.S. PATENT DOCUMENTS

| | | | |
|---|---|---|---|
| 5,947,393 A * | 9/1999 | Unruh | A01G 25/092 239/729 |
| 6,095,439 A | 8/2000 | Segal et al. | |
| 6,726,132 B2 | 4/2004 | Malsam | |
| 8,401,704 B2 | 3/2013 | Pollock et al. | |
| 8,494,763 B1 | 7/2013 | Wieting | |
| 9,164,177 B1 | 10/2015 | Schlautman et al. | |
| 9,392,754 B1 * | 7/2016 | Summers | A01G 25/092 |
| 2012/0305682 A1 | 12/2012 | Korus | |
| 2015/0129680 A1 | 5/2015 | Abts et al. | |
| 2019/0021245 A1 | 1/2019 | Thatcher | |
| 2020/0154655 A1 | 5/2020 | Dick et al. | |
| 2020/0396912 A1 * | 12/2020 | Stouffer | E04H 12/344 |

OTHER PUBLICATIONS

International Application PCT/US2020/040273, International Search Report and Written Opinion dated Sep. 25, 2020, 15 pages.

* cited by examiner

*Primary Examiner* — Mark A Connolly
(74) *Attorney, Agent, or Firm* — Milligan PC LLO

(57) ABSTRACT

The present invention relates generally to a system and method for detecting and adjusting the position of an irrigation span. More particularly, the present invention provides a system and method for detecting and removing deflection stresses from irrigation spans caused by corner arm positioning.

20 Claims, 9 Drawing Sheets

SYSTEM AND METHOD FOR DETECTING AND REMOVING DEFLECTION STRESSES FROM IRRIGATION MACHINE SPANS

RELATED APPLICATIONS

The present application claims the benefit of U.S. Provisional Application No. 62/873,392 filed Jul. 12, 2019 which application is hereby incorporated herein by reference.

BACKGROUND AND FIELD OF THE PRESENT INVENTION

Field of the Present Invention

The present invention relates generally to a system and method for detecting and adjusting the position of an irrigation span. More particularly, the present invention provides a system and method for detecting and removing deflection stresses from irrigation spans caused by corner arm positioning.

BACKGROUND OF THE INVENTION

Center pivot and linear irrigation systems generally include interconnected spans (e.g., irrigation spans) supported by one or more tower structures to support water conduits (e.g., water pipe sections). In turn, the conduits are further attached to sprinkler/nozzle systems which spray or release water (or other applicants) in a desired pattern.

Corner machines are added to irrigation systems to increase the portion of irrigated area inside of a given field boundary. Corner machines include a corner span which rotates from a connection point at the end of the main span or lateral. The corner machine includes one or more steerable drive units (SDUs) which support and move the corner span.

To follow a given guidance path, a corner machine must be capable of moving faster than the main irrigation machine (i.e. to extend and thus increase the effective length of the irrigation machine); and moving slower than the main irrigation machine (i.e. to retract and shorten the effective length of the irrigation machine). To cause the corner to extend, retract, or hold constant, the system must control the speed of the steerable drive unit (SDU). The steering angle of the SDU is traditionally adjusted based on the desired travel direction of the span as determined by the guidance system.

In operation, movement of the SDU can cause significant tension and compression to the corner span. Irrigation systems rely on expensive span sensors to measure the deflection of the corner span to determine if it is in compression or tension. Based on whether the span is in tension or compression, the speed of the SDU drive unit is adjusted to keep the deflection within acceptable limits. Another solution relies on a track and roller design wherein the corner span's position is measured relative to the position of the last regular drive unit (LRDU) and the speed of the SDU is adjusted to keep the corner span position within acceptable limits. These systems are expensive and the high internal compression and tension loads result in additional slippage of the last regular and steerable drive units. This in turn can result in deep wheel tracks and stuck machines. Further, these systems are incapable of allowing a corner span to extend beyond a certain angle due (typically above 170 degrees) to the limitations inherent in these types of control systems (e.g. steering angle solely controlled by the guidance system and speed solely controlled by the span sensor or track and roller position sensor) thus limiting the range of corner angles available to an operator.

To overcome the limitations of the prior art, a reliable and effective system is needed to detect deflections caused by movement of a corner arm. Further, a system is needed which can accurately move a corner arm to reduce the detected deflections.

SUMMARY OF THE PRESENT INVENTION

To address the shortcomings presented in the prior art, the present invention provides a system and method for detecting and removing deflection stresses from irrigation spans caused by corner arm positioning and increasing the range of corner angles available to an operator.

According to a preferred embodiment, the present invention uses real-time kinematics-corrected (RTK-corrected) GPS signals from a last regular drive unit (LRDU) of an irrigation span and from a steerable drive unit (SDU) of a corner span to remove deflection stresses.

According to a further preferred embodiment, the system of the present invention provides a method to adjust the speed of the SDU and/or LRDU to ensure the corner span loads and/or position are maintained within acceptable limits. According to a further preferred embodiment, the system of the present invention provides a method to adjust the steering angle of the SDU to ensure that corner span loads and/or position are maintained within acceptable limits.

The accompanying drawings, which are incorporated in and constitute part of the specification, illustrate various embodiments of the present invention and together with the description serve to explain the principles of the present invention.

DESCRIPTION OF THE PREFERRED EMBODIMENTS

Figure 1:
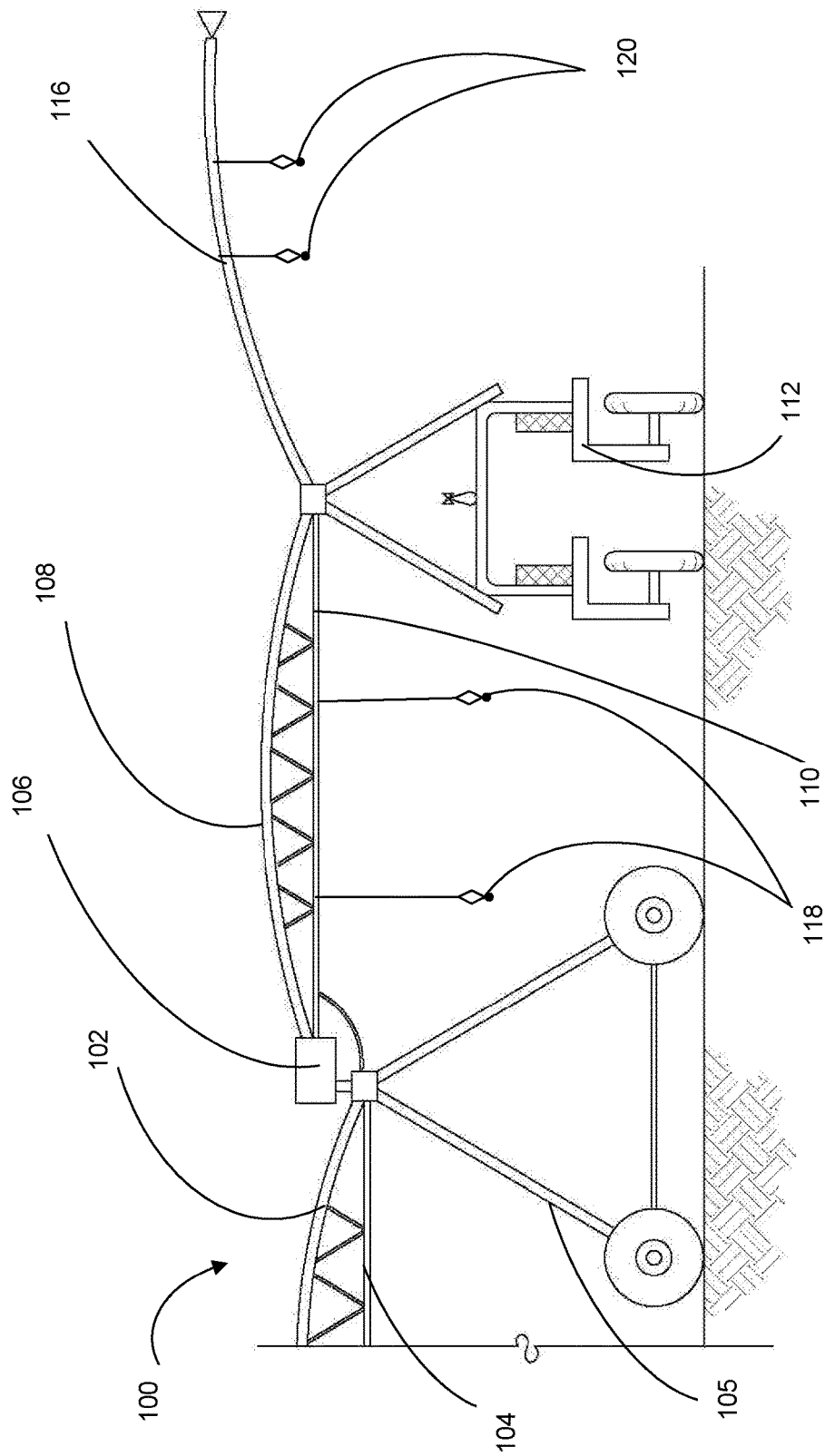
FIG. 1 shows an exemplary irrigation system for use with the present invention.

For the purposes of promoting an understanding of the principles of the present invention, reference will now be made to the embodiments illustrated in the drawings and specific language will be used to describe the same. It will nevertheless be understood that no limitation of the scope of the present invention is hereby intended and such alterations and further modifications in the illustrated devices are contemplated as would normally occur to one skilled in the art.

In accordance with preferred embodiments of the present invention, the term "drive unit" may preferably include a number of sub-components including: a motor, a controller, a communication device and an alignment device. Further, while the invention is discussed below with respect to four exemplary towers, the number of towers used may be expanded or reduced (i.e. 1-100 towers) as needed without departing from the spirit of the present invention. Further, the term "motor" as used herein may refer to any suitable motor for providing torque to a drive wheel. Accordingly, the term "motor" as used herein may preferably include motors such as switch reluctance motors, induction motors and the like.

The terms "program," "computer program," "software application," "module," firmware" and the like as used herein, are defined as a sequence of instructions designed for execution on a computer system. The term "solid state" should be understood to refer to a range of solid state electronic devices which preferably include circuits or devices built from solid materials and in which the electrons, or other charge carriers, are confined entirely within the solid material. Exemplary solid-state components/materials may include crystalline, polycrystalline and amorphous solids, electrical conductors and semiconductors. Common solid-state devices may include transistors, microprocessor chips, and RAM.

A program, computer program, module or software application may include a subroutine, a function, a procedure, an object implementation, an executable application, an applet, a servlet, a source code, an object code, a shared library, a dynamic load library and/or other sequence of instructions designed for execution on a computer system. A data storage means, as defined herein, includes many different types of computer readable media that allow a computer to read data therefrom and that maintain the data stored for the computer to be able to read the data again. Such data storage can include, for example, non-volatile memory (such as ROM) and volatile storage (such as RAM, buffers, cache memory, and network circuits).

Aspects of the systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the systems and methods includes: microcontrollers with memory, embedded microprocessors, firmware, software, etc. Furthermore, aspects of the systems and methods may be embodied in microprocessors having software-based circuit emulation, discrete logic (sequential and combinatorial), custom devices, fuzzy (neutral network) logic, quantum devices, and hybrids of any of the above device types.

FIG. 1 illustrates an exemplary self-propelled irrigation system 100 which may be used with example implementations of the present invention. As should be understood, the irrigation system 100 disclosed in FIG. 1 is an exemplary irrigation system onto which the features of the present invention may be integrated. Accordingly, FIG. 1 is intended to be illustrative and any of a variety of systems (i.e. fixed systems as well as linear and center pivot self-propelled irrigation systems; stationary systems; corner systems) may be used with the present invention without limitation.

As shown in FIG. 1, the exemplary system 100 may include a pipeline 102 and a main section assembly 104 (irrigation section assembly) coupled (e.g., connected) to the pipeline 102. The pipeline 102 may have access to a ditch, well, water repository (e.g., water tank), or other fluid source, to furnish water to the irrigation system 100. The main section assembly 104 may include interconnected spans supported by one or more drive towers including a last regular drive unit ("LRDU") 105.

The main section assembly 104 may also be attached to a corner span assembly 110 which may support a corner span pipe assembly 108 to provide applicants to one or more sprinklers 118. As further shown, the corner span 110 is preferably attached to the LRDU at a connection point 106 which allows the corner span 102 to laterally rotate from the connection point 106. According to a further preferred embodiment, the lateral movement of the corner span 110 may preferably be propelled by at least one steerable drive unit ("SDU") 112. According to a further preferred embodiment, the corner span 110 may also be connected to a spray boom 116 which may provide applicants to one or more additional sprinklers 120 and/or end guns (not shown).

Figure 2:
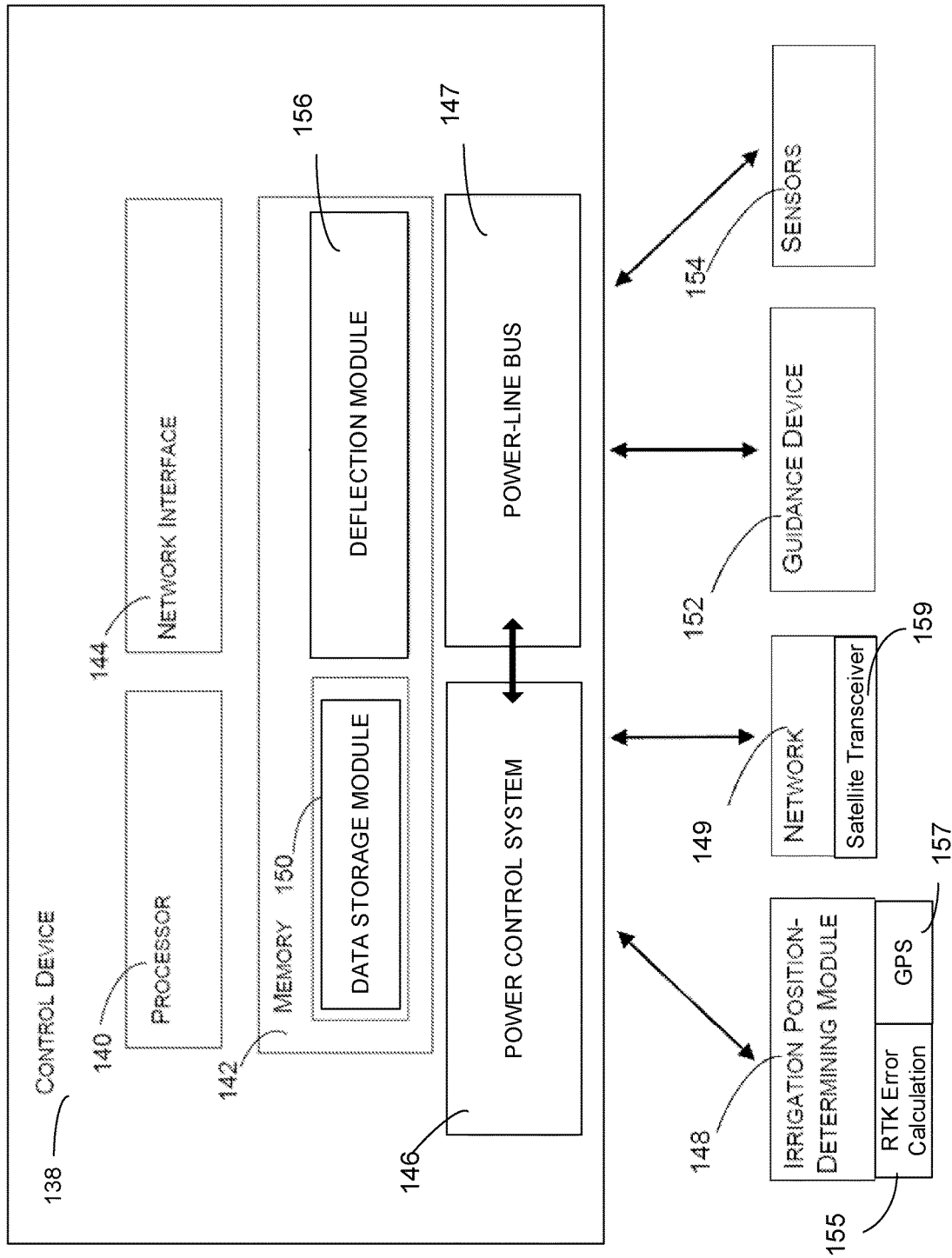
FIG. 2 shows a block diagram illustrating an exemplary processing architecture of a control device in accordance with a first preferred embodiment of the present invention.

With reference now to FIG. 2, an exemplary control device 138 which represents functionality to control one or more operational aspects of the irrigation system 100 will now be discussed. As shown, an exemplary control device 138 preferably includes a processor 140, a memory 142, a data storage module 150, a deflection calculation module 156 and a network interface 144. The processor 140 provides processing functionality for the control device 138 and may include any number of processors, micro-controllers, or other processing systems. The processor 140 may execute one or more software programs that implement techniques described herein. The memory 142 is an example of tangible computer-readable media that provides storage functionality to store various data associated with the operation of the control device 138, such as the software program and code segments mentioned above, or other data to instruct the processor 140 and other elements of the control device 138 to perform the steps described herein. The network interface 144 provides functionality to enable the control device 138 to communicate with one or more networks 149 through a variety of components such as wireless access points, transceivers and so forth, and any associated software employed by these components (e.g., drivers, configuration software, and so on). As shown, a preferred system of the present invention may include a satellite transceiver 159 or the like for receiving direct satellite communications.

In implementations, the exemplary control device 138 preferably further includes a power control system 146 which may include a power-line BUS 147. The system may also include an irrigation position-determining module 148 and a global positioning system (GPS) receiver 157 or the like to calculate a location of the irrigation system 100. The irrigation position determining module 148 may include a real-time kinematics (RTK) Error Calculation Module 155 as discussed further below. The control device 138 may further include a deflection module 156 to execute deflection calculations and adjustments as discussed further below with reference to FIGS. 8 and 9.

As further shown, control device 138 may be coupled to a guidance device or similar system 152 (e.g., steering assembly or steering mechanism) to control movement of the irrigation system 100 and to assist in controlling the movement and locational awareness of the system. Further, the control device 138 may preferably further include multiple inputs and outputs to receive data from sensors 154 and monitoring devices as discussed further below.

According to a preferred embodiment, the RTK Error Calculation Module 155 preferably functions to perform RTK error calculations to enhance the precision of position data derived from the GPS system 157. Although the present invention is discussed with respect to GPS, the present invention applies to data received from other positioning systems such as LORAN, GLONASS, Galileo, BeiDou and the like, as well as any combination of those like systems. Additionally, RTK can utilize a single frequency (commonly known as the L1 band) for corrections or can utilize dual frequencies (commonly known as the L1 and L2 bands). Further like correction technologies (such as WAAS, or Differential GPS) that enhance positional accuracy may be used. Preferably, any such systems would be compatible with the like positioning systems discussed above and provide positional accuracy better than 1 meter.

Figure 3:
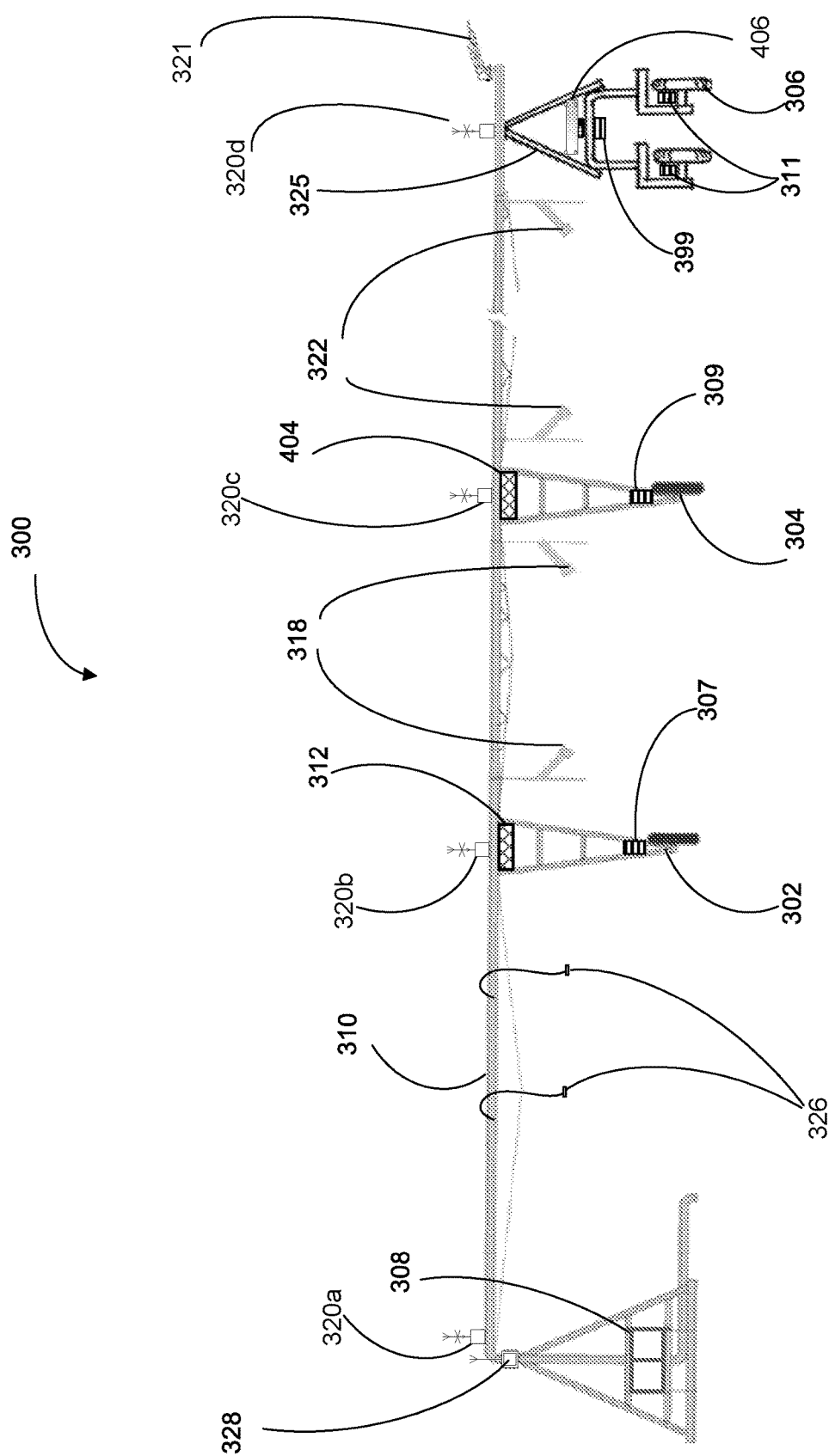
FIG. 3 shows an exemplary irrigation system in accordance with a further preferred embodiment of the present invention.

With reference now to FIG. 3, an exemplary system 300 incorporating aspects of the present invention shall now be-discussed. According to a preferred embodiment, an exemplary irrigation system 300 may include transducers (not shown) which are provided to control and regulate water pressure to sprinklers including the end gun 321 and other sprinkler heads 326.

Further the system may preferably include solid state tower boxes 312, 404, 406 (including the PLC boards, solid-state motor controllers, non-contact alignment devices and other components as discussed above and further with respect to FIG. 4 below) which are preferably interconnected to respective drive unit motors 307, 309, 311. As further shown, the respective drive unit motors 307, 309, 311 preferably provide torque and braking to respective sets of drive wheels 302, 304, 306. As further shown a steering system 399 receives steering signals from the SDU solid state tower box 406 to turn the SDU wheels 306 changing the direction of the steerable drive unit 325 as commanded by the guidance controller as discussed below. The steering system may be any suitable system for turning the SDU wheels such as an electric motor, an electric actuator, a hydraulic actuator or the like attached to a steering linkage or the like. As discussed above, the system of the present invention may include any suitable motor for providing torque to a drive wheel. According to a preferred embodiment, the system of the present invention may preferably include motors such as switch reluctance motors, induction motors and the like.

Further, the system 300 of the present invention may preferably further include a control/pivot panel 308 as well as elements such as a GPS receivers 320*a-d* for receiving positional data. Still further, a system of the present invention may further include indirect crop sensors 318, 322 which preferably may include optional moisture sensors to determine the moisture levels in a given area of soil. Additionally, the sensors 318, 322 may further include optics to allow for the detection of crop type, stage of grown, health, presence of disease, rate of growth and the like. Still further, the system may include ground sensors. Still further, the detection system may further receive data from a connected or remote weather station or the like which is able to measure weather features such as humidity, wind speed, wind direction, pressure, precipitation, temperature and the like. Further, the preferred system of the present invention may alternatively further include additional elements mounted to the span 310 such as additional sensors and the like.

As further shown in FIG. 3 and as discussed further below, a preferred system of the present invention may further include a Real Time Kinematic (RTK) reference station 328 for providing error correction data to all GPS units on the machine, including the roving receiver which may be attached to a steerable drive unit (SDU) 325 or the like as discussed further below. Preferably, the RTK reference receiver 320*a* is positioned on a very accurately surveyed point. Still further, the RTK reference station 328 preferably receives GPS signals and calculates error correction data based on the location differences between the surveyed location and the location data indicated by the measured GPS signals.

Figure 4:
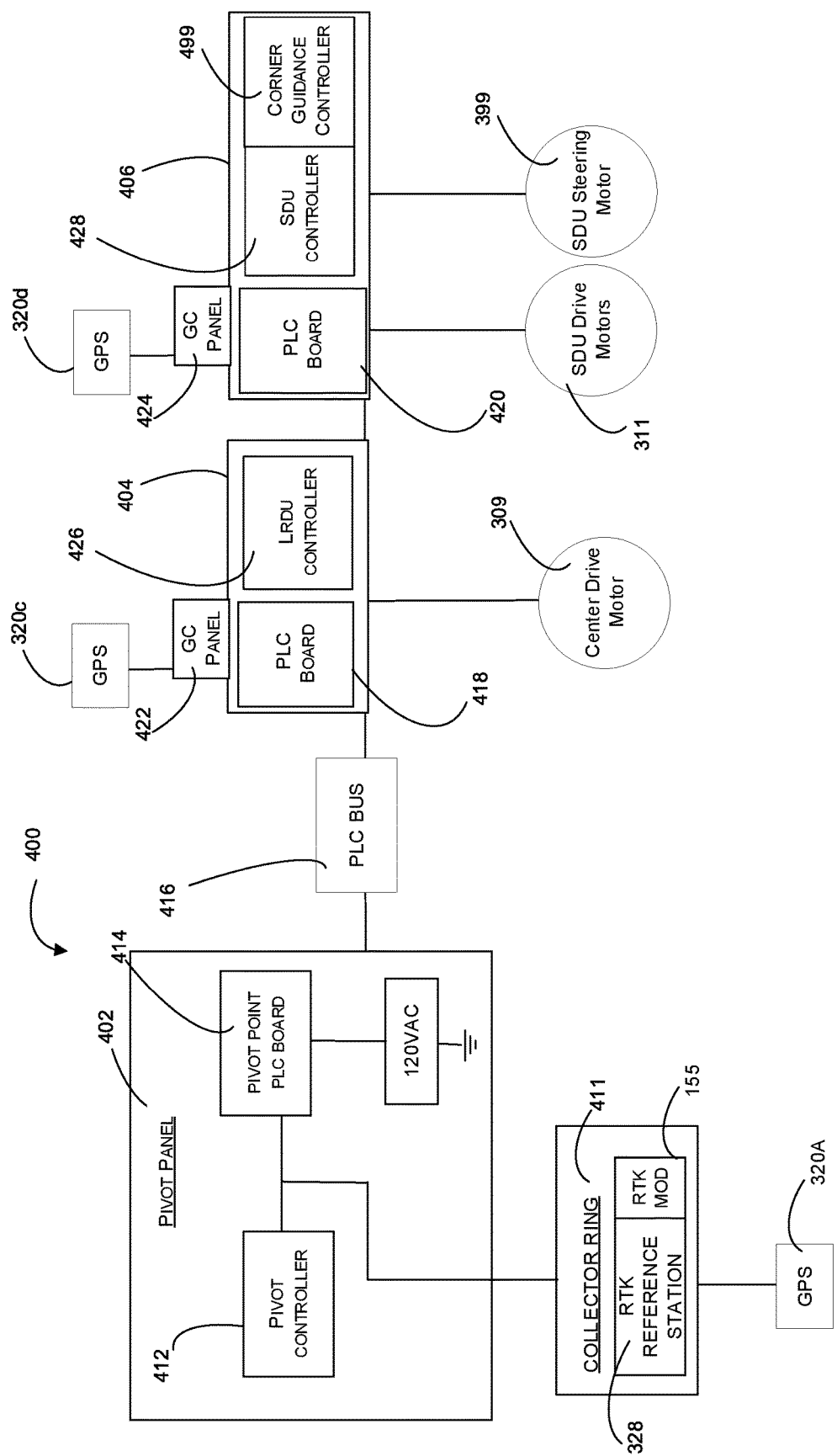
FIG. 4 shows a block diagram illustrating an exemplary system architecture in accordance with further aspects of the present invention.

With reference now to FIG. 4, an exemplary system architecture 400 shall now be discussed. As shown, an RTK reference station 328 is provided to receive GPS signals from the GPS receiver 320*a*. Once received, the RTK reference station 328 (alone and/or in combination with the pivot controller 412 and the RTK Error Calculation Module 155), creates error correction data, which is then transmitted by the pivot controller 412 as an error correction data signal to the pivot point PLC board 414. The pivot point PLC board 414 then preferably modulates the error correction data signal and transmits the signal through the power line BUS 416 and PLC system to one or more downstream tower boxes 404, 406. In this way, each receiving tower box 404, 406 of the present invention receives enhanced RTK guidance. According to a further preferred embodiment, the tower boxes 404, 406 of the present invention may further transmit precision GPS location data back to the pivot controller 412, or to each other as discussed further below According to a further preferred embodiment, the RTK reference receiver 328 may preferably be located within a collector ring/slip ring device 411 attached to the center pivot point. According to alternative preferred embodiments, the location (longitude, latitude) of the RTK reference receiver 320*a* may be set by any method known in the art. For example, the RTK receiver location may be manually set by user input from data gathered outside the system. Alternatively, the RTK receiver location may be set via a "survey mode" where the location of the unit is determined using known algorithms to time-average GPS positional data gathered by the receiver.

As further shown in FIG. 4, the control/pivot panel box 402 of the present invention may preferably include a main pivot controller 412 connected to a pivot point PLC board 414 which controls and directs power to downstream tower boxes/units 312, 404, 406. The tower boxes/units 404, 406 may include GPS sensors/inputs 408, 410.

According to preferred embodiments, the pivot panel box 402 preferably provides power and control signals through the pivot point PLC board 414 to the downstream solid-state tower boxes 404, 406 via a power-line BUS 416. Alternatively, any other type of control and communication systems may also be used. For example, the signals of the present invention may be transmitted between system elements using any wireless (e.g. Wi-Fi, Zigbee) or wired protocol (e.g. PLC, ethernet). Further, the present invention is not intended to be limited to the use of solid-state tower boxes. For example, electro-mechanical tower boxes may be used with or without a PLC system without departing from the scope of the present invention.

As further shown in FIG. 4, the LRDU and SDU drive tower boxes 404, 406 preferably include controllers 426, 428 and GPS guidance control (GC) panels 422, 424 for receiving and processing guidance control signals. They may also include PLC boards 418, 420 for receiving, transmitting and translating control and power signals between the tower box controllers 426, 428 and the other systems communicating through the power-line BUS 416 as discussed further below.

In operation, GPS data is preferably first received by the RTK reference station 328. Thereafter, the data is provided to the RTK Error Calculation Module 155 which compares the received GPS locational data to the surveyed location of the RTK reference station and calculates and produce GPS error correction data. Thereafter, the RTK Error Calculation module 155 preferably transmits the RTK error correction data to the pivot point PLC board 414 where the signal is modulated and transmitted (along with power and control signals provided by the power-line BUS 416) to the downstream tower boxes including LRDU and SDU tower boxes 404, 406 via a power-line BUS 416.

At the same time, the GC systems 422, 424 may preferably receive signals from GPS satellites via GPS sensors 320c, 320d or the like and calculate the position of the unit. As discussed above, such calculations may include data from a Wide Area Augmentation System (WAAS) or the like. The LRDU and SDU controllers 426, 428 may then preferably use the RTK error correction data to calculate their RTK-corrected GPS locations. Thereafter, the LRDU and SDU controllers 426, 428 may transmit their RTK-corrected GPS location data (along with other data such as position, speed and steering angle) to the corner guidance controller 499 as discussed further below. While the corner guidance controller 499 is shown as located in the SDU tower box 420, the guidance controller may be located at any convenient location on the machine such as at the pivot panel 402 or at the LRDU tower box 404.

Figure 5:
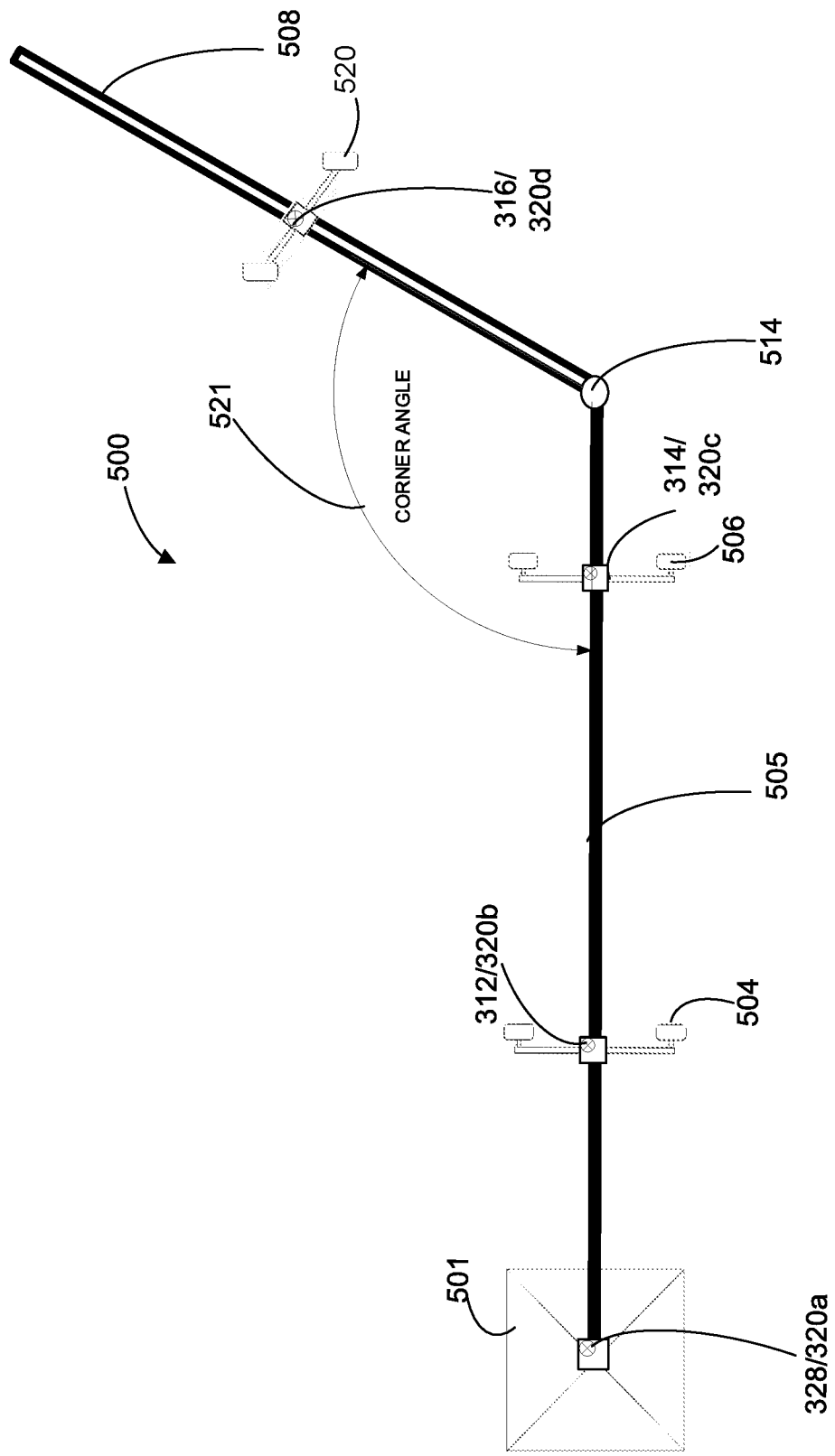
FIG. 5 shows an overhead view of an exemplary irrigation system.
Figure 6:
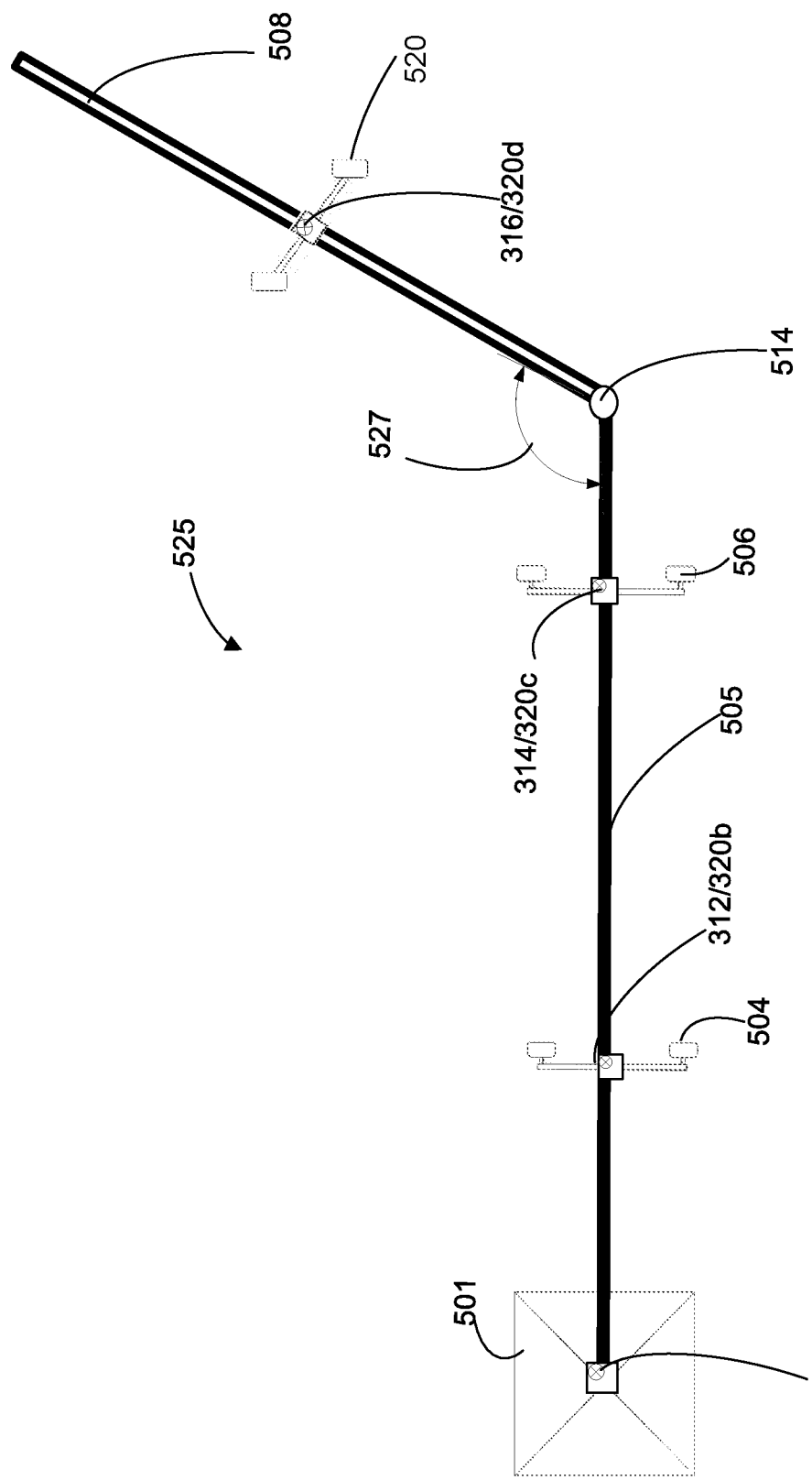
FIG. 6 shows an overhead view of an exemplary irrigation system at a first corner angle.
Figure 7:
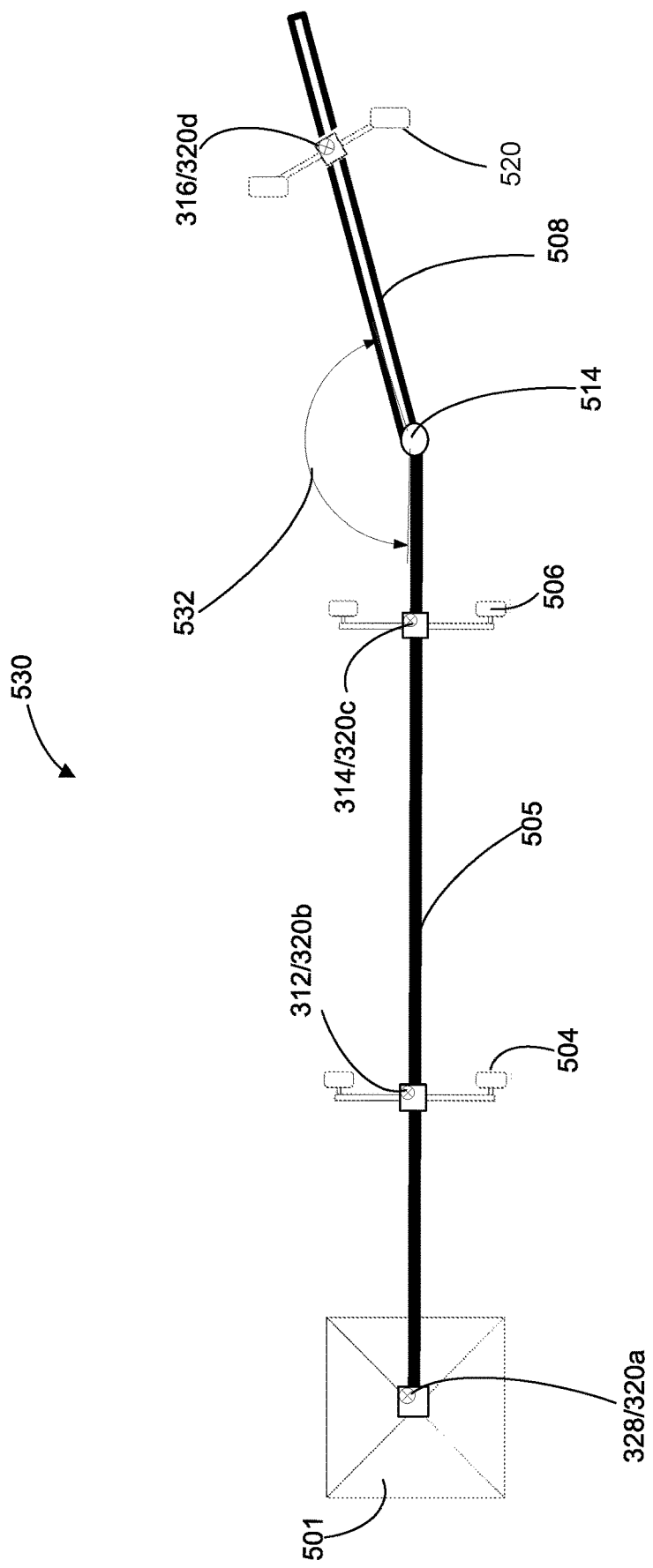
FIG. 7 shows an overhead view of an exemplary irrigation system at a second corner angle.

With reference to FIGS. 5-7, an overhead view of an exemplary irrigation system 500 is shown including a center pivot point 501, a primary span 505 and a corner span 508. As shown, the primary span 505 is supported by a first drive tower 504 and a last regular drive unit (LRDU) 506. The corner span 508 as shown is connected at a connection point 514 and is supported by a steerable drive unit (SDU) 520. As shown, the pivot point 501 includes a receiver/controller 328, 320a for receiving GPS location data and RTK error data. The first drive tower 504 includes a receiver/controller 312, 320b, the LRDU 506 includes a receiver/controller 314, 320c, and the SDU 520 includes a receiver/controller 316, 320d. In the example shown, the SDU 520 has moved the corner span 508 to a given corner angle 521.

Figure 8:
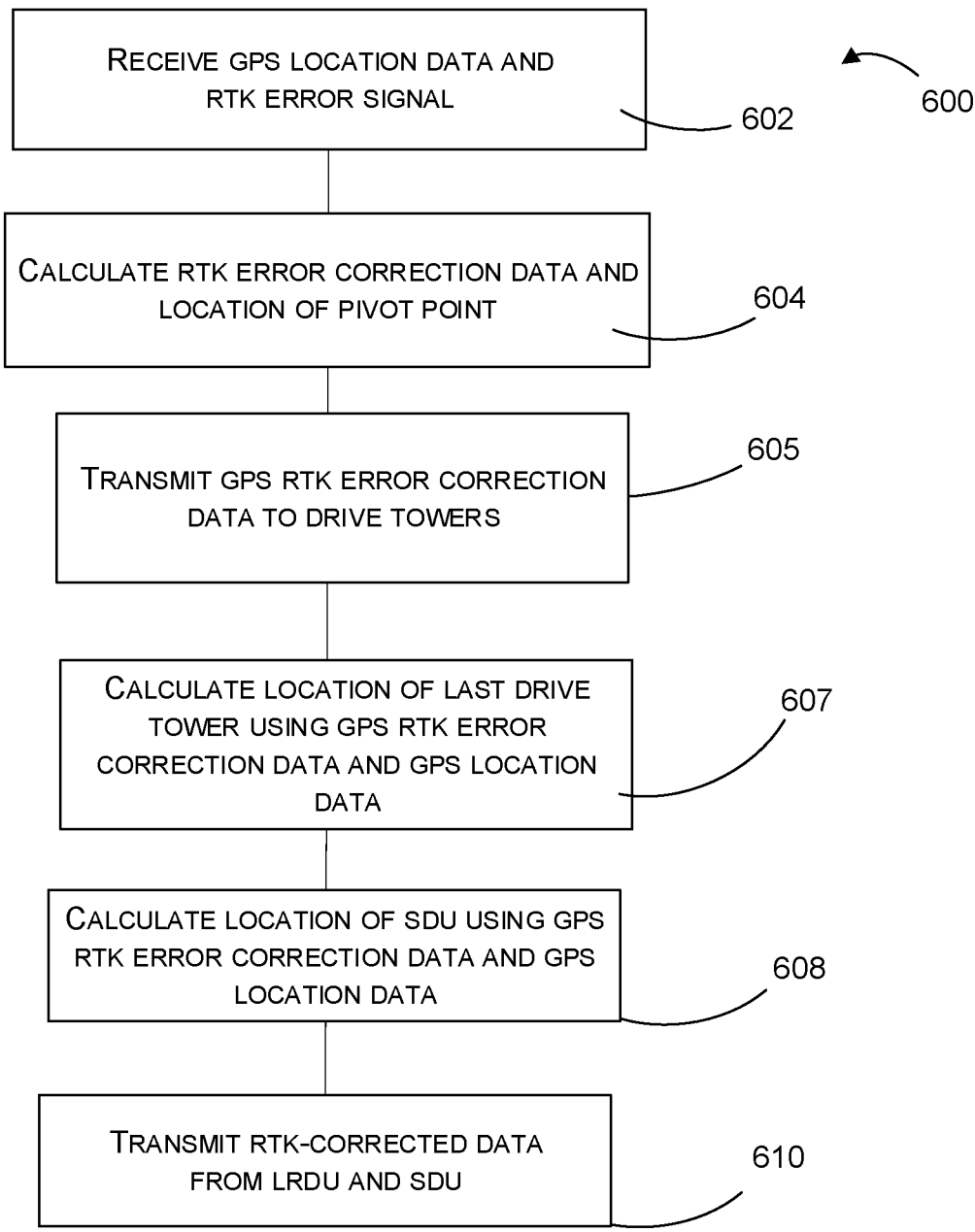
FIG. 8 shows a flow chart illustrating an exemplary method in accordance with a first preferred embodiment of the present invention.

With reference now to FIGS. 5 and 8, an exemplary method 600 shall now be discussed. As shown in FIG. 8, at a preferred first step 602, the RTK reference receiver 320a and RTK reference station 328 located at the pivot point 501 preferably receives GPS location data. At a preferred second step 604, the RTK reference station's error correction module 155 calculates RTK error correction data. Alternatively, a verified location of the pivot point 501 may be retrieved from memory based on a past calculation. According to a preferred third step 605, the GPS location of the pivot point 501 and RTK correction data may be transmitted via a PLC BUS 416 or the like to respective tower boxes 312 and/or guidance control panels 422, 424 on the irrigation machine.

At next step 607, an RTK-corrected GPS location of the LRDU 506 is calculated using GPS data and RTK error correction data. At a next step 608, an RTK-corrected GPS location of the SDU 520 is calculated using GPS data and RTK error correction data. At a next step 610, the RTK-corrected GPS location data is then preferably transmitted from the LRDU 506 and the SDU 520 to the corner guidance controller 499.

Figure 9:
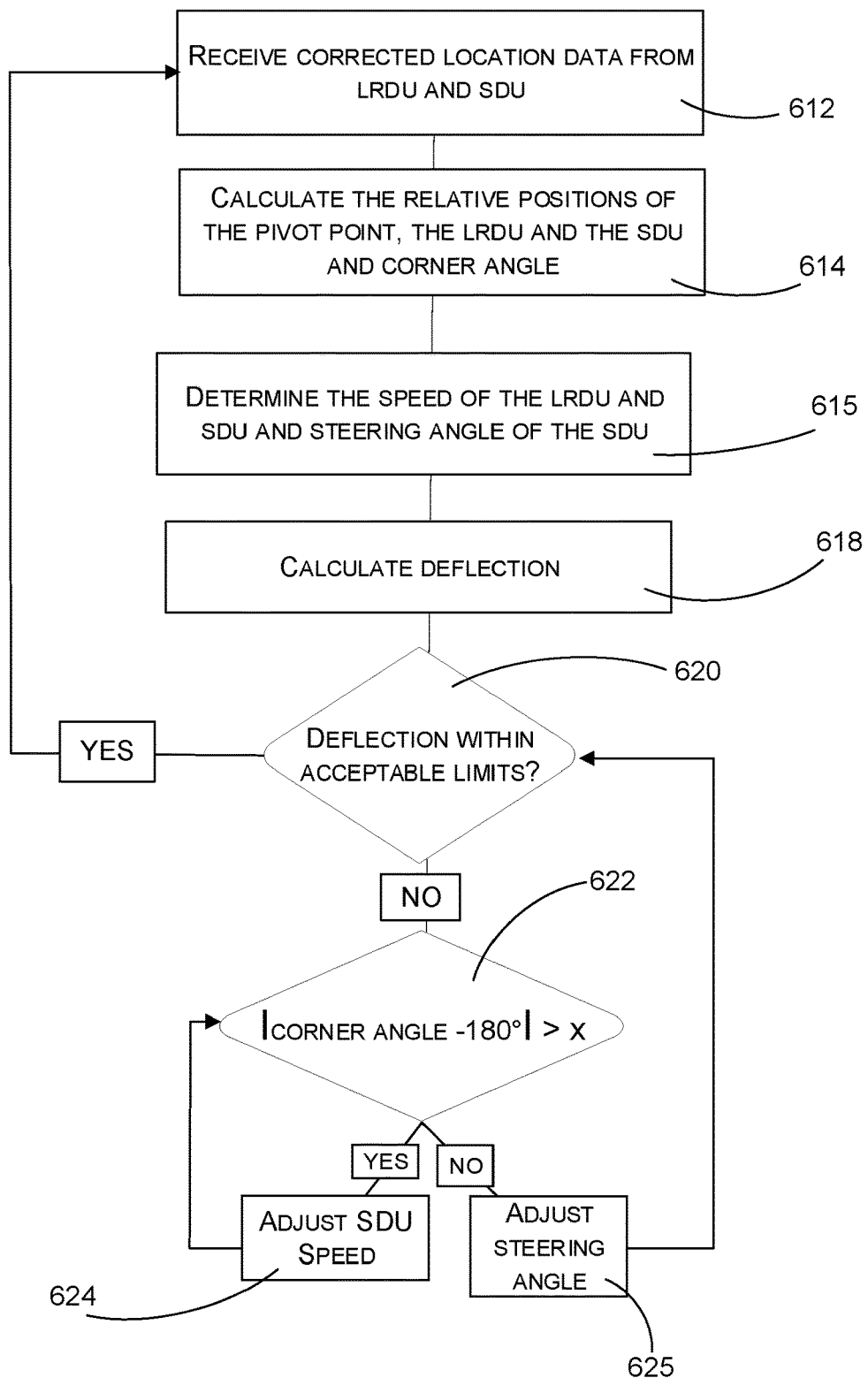
FIG. 9 shows a flow chart illustrating further steps of the exemplary method shown in FIG. 8.

As shown in FIG. 9, at a next step 612, the corner guidance controller 499 preferably receives the RTK-corrected GPS location data from the LRDU 506 and the SDU 520. At a next step 614, the controller 499 preferably calculates the relative positions of the pivot point 501, the LRDU 506 and the SDU 520 and further calculates the corner angle 521 (shown in FIGS. 6-7). Alternatively, a corner angle sensor may replace either the LRDU or SDU GPS receiver/GC panel and the missing parameter calculated using the corner angle sensor and the position data from the remaining GPS receiver/GC panel.

At a next step 615, the corner guidance controller 499 determines/receives the speed of the LRDU and the SDU. In addition, the controller 499 determines/receives the steering angle of the SDU as defined by the guidance path (determined during design or installation of the machine).

At a next step 618, the controller 499 preferably calculates the amount of deflection using the RTK-corrected location data in order to determine if the corner span 508 is in compression or tension (or unacceptably out of position if a Track and Roller joint is used at the LRDU 106). Preferably, the deflection calculations may be made by comparing the distance between the LRDU and SDU against a pre-determined value based on the length of the corner span, whether water is present in the span, gasket compression, thermal growth (as calculated by constant multiplied by the difference between the ambient temperature and a reference temperature), and the like. Alternatively, the amount of deflection may preferably be determined by comparing the change in distance between the LRDU and SDU when the machine operation is initiated, when the machine is initially installed or the like with the present distance. Further, the amount of deflection may be determined by using a look-up table which stores deflection amounts based on measured distances between the LRDU and SDU.

At a next step 620, the corner guidance controller 499 preferably determines whether the amount of deflection is with acceptable threshold limits. If YES, the system preferably returns to step 612 to receive updated location data. If NO, the system next proceeds to step 622 and determines whether the corner angle 521 is significantly more or less than 180°. According to a preferred embodiment, an exemplary equation may be:

$$|CORNER\ ANGLE - 180°| > X$$

(where X is the threshold amount of variance from 180°)

According to a preferred embodiment, the threshold amount of variance (X) may be selected by a user or may be pre-set in the system. According to an exemplary embodiment, the threshold amount of variance (X) may be set to +/−5°, 10°, 15°, 20°, 25°, 30°, 35° or 40°.

At a next step 624, if the corner angle 521 exceeds the threshold amount of variance (X), the system may then preferably adjust the SDU speed by a set amount. Based on whether the span is in tension or compression (positive or negative deflection), the speed of the SDU may be increased or decreased to move the amount of deflection within acceptable limits. This may preferably be accomplished by adjusting the duty cycle of a start-stop motor, by increasing or reducing the RPM of a variable speed motor (such as a switch reluctance motor or an induction motor driven by a variable frequency drive) or by like methods. According to a preferred embodiment, the speed of the SDU may be changed by any increment between 1-100%. According to an alternative preferred embodiment, the speed of a drive wheel may be controlled by adjusting or changing the programmed average speed of the drive wheel. For illustration, FIG. 6 provides an overhead view of an exemplary irrigation system 525 with a corner angle 527 of approximately 110° (producing a variance of 70°) which may trigger an adjustment to the speed of the SDU 520 (e.g. if the variance threshold (X) is set to 30°).

Thereafter, the method preferably returns to step 622 to again calculate the amount of variance. If at step 622, the system determines that the amount of variance is less than the threshold amount of variance (X), the system at step 625 then preferably adjusts the steering angle of the SDU by a set amount, where the set amount is sufficient to relieve. For illustration, FIG. 7 provides an overhead view of an exemplary irrigation system 530 with a corner angle 532 of approximately 155° (producing a variance of 25°) which may trigger an adjustment only to the steering angle of the SDU 520 (e.g. if the variance threshold (X) is set to 30°).

Based on whether the span is in tension or compression (positive or negative deflection), the steering angle may be increased or decreased to move the amount of deflection within acceptable limits. According to a preferred embodiment, the speed of the SDU may be change by any increment between 0.1-45°. Thereafter, the system preferably returns to step 620 to determine whether the amount of defection is within acceptable limits. If YES, the system preferably returns to step 612 to receive updated location data. If NO, the system next proceeds to step 622 and determines again whether the corner angle 521 is significantly more or less than 180°.

It should be noted that permitted steering angle changes are of limited amplitude sufficient to relieve the tension/compression of the span but not sufficient to cause the SDU deviate excessively from the pre-defined travel path. Where excessively may be defined as any value from 1 inch to 10 inches. Further the LRDU speed may also be adjusted in concert with the above to maintain correct orientation between machine elements and to manage the deflection of the corner span.

Preferably, the transmissions, calculations and adjustments by present invention may be continually performed in real time to maintain both correct corner angle and SDU path during irrigation. Further, the method of present invention may operate when the pivot is not moving (and the corner arm is moving) or during the operation and running of the irrigation system. Additionally, a mixture (or blended percentage) of speed correction and steering angle correction may be used based on changes in the corner angle. An example table is provided below.

| Variance from 180° | % Steering Angle Adjustment | % of Speed Adjustment |
| --- | --- | --- |
| 0-5° | 100% | 0% |
| 5-10° | 70% | 30% |
| 10-20° | 60% | 40% |
| 20-40° | 40% | 60% |
| More than 40° | 0% | 100% |

Using this method, the corner arm can transition from a trailing orientation (e.g. corner arm traverses an area of the field after the pivot has passed) to a leading orientation (e.g. corner arm traverses an area of the field before the pivot arrives).

While the above descriptions regarding the present invention contain much specificity, these should not be construed as limitations on the scope, but rather as examples. Many other variations are possible. For example, the processing elements of the present invention by the present invention may operate on a number of different frequencies, voltages, amps and BUS configurations. Further, the communications provided with the present invention may be designed to be duplex or simplex in nature. Further, the systems of the present invention may be used with any arrangement of drive towers including both linear and center pivot systems. Further, as needs require, the processes for transmitting data to and from the present invention may be designed to be push or pull in nature. Still, further, each feature of the present invention may be made to be remotely activated and accessed from distant monitoring stations. Accordingly, data may preferably be uploaded to and downloaded from the present invention as needed.

Accordingly, the scope of the present invention should be determined not by the embodiments illustrated, but by the appended claims and their legal equivalents.

What is claimed is:

1. An irrigation system for detecting and removing deflection stresses from irrigation machine spans, wherein the irrigation machine comprises a center pivot, a primary span and a corner span, the system comprising:
a Programable Logic Controller (PLC) board, wherein the PLC board comprises a modulator, a filter, an amplifier, a line matching unit, and a coupling device;
a pivot controller, wherein the pivot controller is configured to send control signals to the PLC board;
a PLC Bus, wherein the PLC Bus is configured to receive control signals from the PLC board and to transmit the control signals onto a power transmission line for distribution to a plurality of powered devices;
a first Global Positioning System (GPS) receiver, wherein the first GPS receiver is configured to receive first GPS data;
a Real Time Kinematics (RTK) reference station, wherein the RTK reference station comprises an RTK reference receiver for receiving RTK reference data;
a slip ring connector, wherein the slip ring connector is attached to the center pivot; wherein the RTK reference receiver is located within the slip ring connector;
an RTK error calculation module, wherein the RTK error correction module is configured to receive the first GPS data and the RTK reference data; wherein the RTK error calculation module is configured to create error correction data based at least in part on the first GPS data and the RTK reference data; wherein the pivot controller is configured to transmit the error correction data as an RTK error correction data signal to the PLC board; wherein the PLC board is configured to transmit the RTK error correction data signal through the PLC Bus to one or more downstream driver towers;
a last regular drive unit (LRDU) drive tower; wherein the LRDU drive tower comprises an LRDU PLC board, an LRDU controller, an LRDU guidance control panel, and an LRDU GPS receiver;
wherein the LRDU controller is configured to receive the RTK error correction data; wherein the LRDU controller is configured to calculate a first set of corrected GPS position data based at least in part on the error correction data;
wherein the LRDU controller is configured to transmit the first corrected GPS position data to the pivot controller;

a steerable drive unit (SDU) drive tower, wherein SDU drive tower comprises a steerable drive unit (SDU) for moving the corner span; an SDU PLC board, an SDU controller, an SDU guidance control panel, and an SDU GPS receiver; wherein the SDU controller is configured to receive the error correction data; wherein the SDU controller is configured to calculate a second set of corrected GPS position data based at least in part on the error correction data; wherein the SDU controller is configured to transmit the second corrected GPS position data to the pivot controller;

a deflection module, wherein the deflection module is configured to calculate the span deflection between the main span and the corner span; wherein the span deflection is calculated at least in part on the error correction data and GPS data received by the SDU GPS receiver; wherein the deflection module is further configured to calculate whether the span deflection is within a stored threshold limit.

2. The system of claim 1, wherein the LRDU controller and the SDU controller transmit additional driver tower data to the deflection module; wherein the drive tower data comprises data selected from the group of data comprising: speed and steering angle.

3. The system of claim 2, wherein the SDU controller is configured to adjust the speed of the SDU drive tower based at least in part on whether the span deflection outside the stored threshold limit.

4. The system of claim 2, wherein the SDU controller is configured to adjust the speed of the SDU drive tower by adjusting the duty cycle of a start-stop motor.

5. The system of claim 2, wherein the SDU controller is configured to adjust the speed of the SDU drive tower by changing the RPM of a variable speed motor.

6. The system of claim 1, wherein the deflection module is located within the SDU guidance controller.

7. The system of claim 6, wherein span deflection is calculated by comparing the distance between the LRDU drive tower and SDU driver tower against a pre-determined value based on the length of the corner span.

8. The system of claim 7, wherein span deflection is calculated at least in part based on the amount of water present in the main irrigation span.

9. The system of claim 8, wherein the span deflection is calculated at least in part on gasket compression.

10. The system of claim 9, wherein the span deflection is calculated at least in part on thermal growth;
wherein the thermal growth is as calculated by a constant multiplied by the difference between a detected ambient temperature and a reference temperature.

11. The system of claim 10, wherein the span deflection is calculated at least in part by using a look-up table which stores deflection amounts based on measured distances between the LRDU drive tower and SDU drive tower.

12. A method for detecting and removing deflection stresses from irrigation machine spans, wherein the irrigation machine comprises a primary span and a last regular drive unit (LRDU) for moving the primary span around a center pivot;
wherein the irrigation machine further includes a corner machine; wherein the corner machine is rotatably attached to the primary span; wherein the corner machine includes a corner span and a steerable drive unit (SDU) for moving the corner span; wherein the LRDU comprises an LRDU drive tower and an LRDU controller; wherein the SDU comprises an SDU driver tower and an SDU controller; the method comprising:

receiving a Real Time Kinematics (RTK) error correction signal;
calculating RTK error correction data;
creating an RTK data signal, wherein the RTK data signal comprises RTK error correction data;
modulating the RTK data signal for transmission;
transmitting the RTK data signal to an LRDU controller and an SDU controller;
de-modulating the RTK error data signal;
receiving a first set of Global Positioning System (GPS) location data for the SDU;
calculating an RTK-corrected location for the SDU using the RTK error correction data;
transmitting SDU data to the pivot controller, wherein the SDU data comprises: the RTK-corrected location for the SDU, a speed of the SDU, and a steering angle of the SDU;
receiving a second set of GPS location data for the LRDU;
calculating an RTK-corrected location for the LRDU using the RTK error correction data;
transmitting LRDU data to the pivot controller, wherein the LRDU data comprises: the RTK-corrected location for the LRDU and a speed of the LRDU;
calculating a corner angle, wherein the corner angle comprises the angle between the primary span and the corner span;
calculating a deflection amount; wherein the deflection amount is calculated using the RTK-corrected location for the SDU and for the RTK-corrected location for the LRDU;
calculating a variance amount, wherein the variance amount is equal to the angular distance between the corner angle and $180°$;
determining whether the deflection amount exceeds a stored deflection threshold;
determining whether the variance amount exceeds a stored variance threshold;
adjusting the speed of the SDU if the deflection amount exceeds the deflection threshold and the variance amount exceeds the variance threshold; and
adjusting the steering angle of the SDU if the deflection amount exceeds the deflection threshold and the variance amount is below the stored variance threshold.

13. The method of claim 12, wherein the speed of the SDU drive tower is adjusted by changing the duty cycle of a start-stop motor.

14. The method of claim 13, wherein span deflection is calculated by comparing the distance between the LRDU driver tower and SDU driver tower against a pre-determined value based on the length of the corner span.

15. The method of claim 14, wherein the span deflection is calculated at least in part on the amount of water present in the main irrigation span.

16. The method of claim 14, wherein the span deflection is calculated at least in part on gasket compression.

17. The method of claim 14, wherein the span deflection is calculated at least in part on thermal growth.

18. The method of claim 17, wherein the thermal growth is as calculated by a constant multiplied by the difference between a detected ambient temperature and a reference temperature.

19. The method of claim 14, wherein the span deflection is calculated at least in part by using a look-up table which stores deflection amounts based on measured distances between the LRDU driver tower and the SDU drive tower.

20. The method of claim 12, wherein the speed of the SDU drive tower is adjusted by changing the RPM of a variable speed motor.

\* \* \* \* \*